US012774929B2

(12) United States Patent
Meyer et al.

(10) Patent No.: US 12,774,929 B2
(45) Date of Patent: Oct. 27, 2026

(54) CALIBRATION METHOD FOR A DIFFERENTIAL SCANNING CALORIMETER

(71) Applicant: Mettler-Toledo GmbH, Greifensee (CH)

(72) Inventors: Thomas Meyer, Zürich (CH); Thomas Huetter, Niederrohrdorf (CH)

(73) Assignee: Mettler-Toledo GmbH, Greifensee (CH)

( * ) Notice: Subject to any disclaimer, the term of this patent is extended or adjusted under 35 U.S.C. 154(b) by 314 days.

(21) Appl. No.: 18/376,290

(22) Filed: Oct. 3, 2023

(65) Prior Publication Data

US 2024/0118226 A1 Apr. 11, 2024

(30) Foreign Application Priority Data

Oct. 4, 2022 (EP) .................................... 22199672

(51) Int. Cl.
*G01N 25/48* (2006.01)
*G01K 19/00* (2006.01)
*G01N 25/20* (2006.01)

(52) U.S. Cl.
CPC ............ *G01K 19/00* (2013.01); *G01N 25/20* (2013.01); *G01N 25/4866* (2013.01)

(58) Field of Classification Search
USPC ........................................................... 374/31
See application file for complete search history.

(56) References Cited

U.S. PATENT DOCUMENTS

| | | | | |
|---|---|---|---|---|
| 5,474,385 | A * | 12/1995 | Reading ............ | G01N 25/4833 374/33 |
| 6,561,692 | B2 | 5/2003 | Danley | |
| 11,204,289 | B2 | 12/2021 | Danley | |
| 2004/0001524 | A1* | 1/2004 | Jorimann .......... | G01N 25/4833 374/33 |
| 2010/0195695 | A1 | 8/2010 | Van De Kerkhof et al. | |
| 2021/0190708 | A1* | 6/2021 | Danley ................. | G01N 25/20 |

FOREIGN PATENT DOCUMENTS

| | | | | |
|---|---|---|---|---|
| EP | 1182439 | A1 | 2/2002 | |
| EP | 1340969 | A1 * | 9/2003 | ............ G01K 17/00 |
| WO | WO-2010084313 | A1 * | 7/2010 | .......... G01N 25/486 |

* cited by examiner

*Primary Examiner* — Mirellys Jagan
(74) *Attorney, Agent, or Firm* — Standley Law Group LLP; Jeffrey S. Standley; Adam J. Smith

(57) ABSTRACT

A differential scanning calorimeter includes a temperature-controlled heat source and a sensor arrangement with sample- and reference-side pan support regions and measurement regions. Measurement region sensor(s) output a differential heat flow signal representative of a difference between heat flowing across the sample- and reference-side measurement regions and a sample- and reference-side local heater arrangement. A sample and reference pan are arranged on the sample and reference-side pan support region, respectively. A volume surrounding the pans is filled with a measuring gas. A steady state situation of a desired temperature is created, and once reached, heating power is applied to one of the pan support regions using the respective local heater arrangement. A second calibration factor is determined based on a ratio of a differential heat flow signal (U) and a differential heating power.

14 Claims, 1 Drawing Sheet

CALIBRATION METHOD FOR A DIFFERENTIAL SCANNING CALORIMETER

CROSS-REFERENCE TO RELATED APPLICATIONS

This application claims the benefit of European Patent Application No. 22199672.1 filed Oct. 4, 2022, the disclosures of which are hereby incorporated by reference as if fully restated herein.

TECHNICAL FIELD

Exemplary embodiments relate generally to calibration methods for differential scanning calorimeters.

BACKGROUND AND SUMMARY OF THE INVENTION

The invention relates to a method for calibrating a differential scanning calorimeter. It relates especially to a method to determine a second calibration factor which allows to adapt a given calibration to a desired measurement gas and temperature without the need for measurements with reference substances. It relates further to a method to determine a conversion factor which characterizes the geometry inside the differential scanning calorimeter and which can be used together with the second calibration factor to calibrate measurements of a differential scanning calorimeter without or with only very few measurements with reference substances. Finally, the invention relates to a self-calibrating differential scanning calorimeter which uses at least one of the methods according to the invention.

A differential scanning calorimeter measures the heat flow to or from a sample in reaction to the temperature of the sample. Thereby, it can detect and characterize phase changes of the sample.

During a measurement, the sample is placed in a pan. The pan and the sample inside are in thermal contact with a temperature controlled heat source, typically a furnace. The pan is typically arranged on a pan support region which is part of a sensor arrangement. The volume surrounding the pan otherwise is filled with a measurement gas. The sensor arrangement comprises a measurement region and a measurement region sensor which outputs a signal indicative of the heat flow through the measurement region.

The measurement gas can be characterized by its chemistry or by its density respectively pressure at the temperature of the measurement. The measurement gas can be air at a pressure equal to the one of the surrounding or it can differ from this condition by a lower or a high pressure or density and/or by a different chemistry.

A calibration is needed to establish a relationship between the output of the sensor arrangement and the positive or negative heat flow produced by the sample.

Obviously, some heat produced or needed by the sample will bypass the path via the pan support region and flow through the measurement gas surrounding the pan. The ratio of the effectiveness of the heat flow path through the pan support region and the heat flow path through the measurement gas depends—besides the sensor arrangement and its mounting—mostly on the choice of the pan and the measurement gas and partially on the temperature of the measurement. Therefore, a calibration should take at least these factors into account.

In the prior art, differential scanning calorimeter are calibrated with calibration samples: Reference substances with known transition properties at different temperatures are placed in pans of the desired type for the measurement and measured while being surrounded by the measurement gas. The calibration factor is determined by comparison of the reading of the prior art sensor arrangement with the known values of the positive or negative heat flow produced by the sample.

This method has at least two drawbacks: On the one hand, the temperatures at which at calibration measurement can be done are limited to the phase transitions of the reference substances. On the other hand, such calibrations are time consuming and need to be repeated for every pan type and measurement gas.

The invention allows to overcome these problems, by applying a calibration function which uses at least a second calibration factor $C_E$. The second calibration factor $C_E$ is determined with the help of electrical heaters instead of a reference substance: This allows to determine the second calibration factor $C_E$ at every temperature and with every measurement gas, independent of the calibration samples at hand. The second calibration factor $C_E$ can then be used to adapt the calibration to the chosen measurement conditions.

The differential scanning calorimeter comprises a temperature-controlled heat source and a sensor arrangement.

The sensor arrangement comprises a sample-side pan support region and a reference-side pan support region, a sample-side measurement region and a reference-side measurement region and a sample-side local heater arrangement and a reference-side local heater arrangement. The local heater arrangements are preferably electrical heater arrangements.

The temperature-controlled heat source is preferably a furnace.

The sample-side pan support region is adapted to receive thereon in heat conductive contact therewith a bottom region of a sample pan.

The reference-side pan support regions is adapted to receive thereon in heat conductive contact therewith a bottom region of a reference pan.

The sample-side measurement region surrounds the sample-side pan support region. The reference-side measurement region surrounds the reference-side pan support region.

In one embodiment, a sample-side and reference-side measurement region sensor is operative to output a differential heat flow signal (U) representative of difference between heat flowing across the sample-side measurement region and heat flowing across the reference-side measurement region.

In one embodiment, a sample-side measurement region sensor and a reference-side measurement region sensor are operative to output a sample-side heat flow signal ($U_S$) representative of the heat flowing across the sample-side measurement region and a reference-side heat flow signal ($U_R$) representative of the heat flowing across the reference-side measurement region.

The sample-side local heater arrangement is adapted to apply heating power to the sample-side pan support region.

The reference-side local heater arrangement is adapted to apply heating power to the reference-side pan support region.

A sample pan of a desired pan type is arranged on the sample-side pan support region and a reference pan of the same desired pan type is arranged on the reference-side pan support region. The volume surrounding the sample and the reference pan is filled with a desired measuring gas.

The method to determine a second calibration factor $C_E$ with the differential scanning calorimeter comprises the steps of: creating a first steady state situation of a desired temperature by use of the heat source; once the first steady state is reached, applying heating power to either the sample-side pan support regions or to the reference-side pan support region by the use of the respective local heater arrangement such that a second steady state is reached; determining the second calibration factor based on: the ratio of the differential heat flow signal U, and the differential heating power.

The differential heat flow signal U is in the one embodiment of the differential scanning calorimeter directly the output of the sample-side and reference-side measurement region sensor. In this embodiment, the differential heat flow signal U is measured directly. In the other embodiment of the differential scanning calorimeter the differential heat flow signal U is determined from the sample-side side heat flow signal Us and the reference-side heat flow signal UR as the difference of the two values: $U=U_S-U_R$.

The differential heating power is the difference between the heating power applied to the sample-side and the heating power applied to the reference-side, during the second steady state.

Preferably, the sample-side and the reference-side measurement region comprise the sample-side and reference-side measurement region sensor in the form of a thermoelectric arrangement which is operative to output a differential thermoelectric voltage signal as a differential heat flow signal (U) representative of difference between heat flowing across the sample-side measurement region and heat flowing across the reference-side measurement region.

Preferably, the sample-side measurement region comprises the sample-side measurement region sensor in the form of a thermoelectric arrangement and the reference-side measurement region comprises the reference-side measurement region sensor in the form of a thermoelectric arrangement. The thermoelectric arrangements are operative to output a sample-side thermoelectric voltage signal as a sample-side heat flow signal ($U_S$) representative of the heat flowing across the sample-side measurement region and a reference-side thermoelectric voltage signal as a reference-side heat flow signal ($U_R$) representative of the heat flowing across the reference-side measurement region.

In an embodiment, the sample-side and reference-side measurement region sensor is realized by a thermoelectric arrangement which compares the temperature of the sample-side pan support region with the temperature of the reference-side pan support region. This is preferably done by a thermoelectric arrangement where electric junctions between wires of a first and a second metal are arranged directly below the sample-side pan support region and the reference-side pan support region. The thermoelectric arrangement is operative to output a differential thermoelectric voltage signal as a differential heat flow signal (U) representative of difference between heat flowing across the sample-side measurement region and heat flowing across the reference-side measurement region.

In an embodiment, the sample-side measurement region sensor is a thermometer, preferably a thermoelectric arrangement, measuring the temperature of the sample-side pan support region. The reference-side measurement region sensor of this embodiment is also thermometer, preferably a thermoelectric arrangement, measuring the temperature of the reference-side pan support region. The thermometers are operative to output a sample-side heat flow signal ($U_S$) representative of the heat flowing across the sample-side measurement region and a reference-side heat flow signal ($U_R$) representative of the heat flowing across the reference-side measurement region.

The sensor arrangement can be realized as a single sensing unit or it can be a set of sensing units. If the sensor arrangement is realized as a set of sensing units, it comprises preferably a first sensing unit and a second sensing unit. Thereby the first sensing unit comprises preferably parts associated with the sample side while the second sensing unit comprises parts associated with the reference-side. In another embodiment of a sensor arrangement realized as a set of sensing units, the local heaters are arranged on a first sensing unit while the pan supports and measurement regions are arranged on a second sensing unit. The measurement region sensors can be included into the first or the second sensing unit or belong to a third sensing unit.

The first steady state situation determines preferably the temperature at which the second calibration factor $C_E$ is determined.

During the second steady state, at least one of the local heater arrangements is switched on and provides a known amount of heat to the system. The heat produced by the local heater arrangement flows partially though the measurement region surrounding the respective local heater arrangement and partially to the pan located on the pan support region to which the respective local heater arrangement can provide its heat. The heat flow through the measurement regions produces the heat flow signals of the sample and the reference side or the differential heat flow signal.

Therefore, the ratio of the differential heat flow signal which is based on the measurement and the known heat flow produced by the local heater comprises information: about the heat flow resistance through the measurement region in relation to the total heat flow resistance, or about the heat flow resistance through the contact between pan and pan support and through the measurement gas in relation to the total heat flow resistance.

The situation can be described by a model which is shown and explained with reference to FIG. 2.

In one embodiment, the second calibration factor can be written as follows, with U being the differential heat flow signal and $P_{el}$ being the differential heating power:

$$C_E = \frac{U}{P_{el}}$$

Later measurement results can be calibrated using this result as follows:

$$P_S = \frac{U}{FC_E} - \frac{P_{el}}{F}$$

Whereby $P_S$ is the heat flow to or from the sample, U being the differential heat flow signal and $P_{el}$ being the differential heating power detected during the measurement of the sample. F is a conversion factor which depends of the geometry of the measurement and which can be provided to the user for example in the form of a table. Further options to derive suitable values of the conversion factor F are described below. $C_E$ is the second calibration factor, which was determined with the method according to the invention, using the local heaters of the sensor arrangement.

The calibration can be used for measurement modes using the local heater as well as for measurement mode which do not use them. In this last case, the differential heating power is zero: $P_{el}=0$.

In a preferred embodiment, the sample-side and the reference-side local heater arrangements are realized as electrical heater arrangements. The heating power applied to the sample-side respectively the reference-side is in this embodiment determined by a measurement of the electrical voltage and the electrical current between two terminals of the respective electrical heater arrangements.

Preferably, the electrical resistance $R_S$, $R_R$ of the respective electrical heater arrangement is evaluated to be the ratio of the measured voltage and the measured current and this value is stored together with the temperature of the first steady state. $R_S$ is the electrical resistance of the sample-side electrical heater arrangement. $R_R$ is the electrical resistance of the reference-side electrical heater arrangement.

As the heater will age with time, determining the electrical resistance by measuring both, voltage and current at the same time, enhances the precision compared to an alternative solution where the calibration method comprises the measurement of either the voltage or the current while using a predetermined resistance value to determine the heating power. Storing the electrical resistance values is useful to detect aging effects, damages and asymmetries between the reference and the sample side.

A self-calibrating differential scanning calorimeter according to the invention is suitable to determine a second calibration factor $C_E$ according to the method described above. It comprises in addition to the features of a differential scanning calorimeter suitable to be used for this method, a data evaluation unit.

The data evaluation unit can receive the differential heat flow signal and/or the sample-side and the reference-side heat flow signals and signals indicating the differential heating power and/or the heating power applied to the sample-side respectively the reference-side. In a preferred embodiment, the data evaluation unit can receive the voltage and the current between the respective terminals of both electrical heater arrangements, as signals indicating the heating power applied to the sample-side respectively the reference-side.

Further, the data evaluation unit comprises a memory with a set of instructions. The set of instructions comprises instructions to execute the method to determine a second calibration factor $C_E$.

Preferably, the set of instructions comprises instructions to store a determined second calibration factor $C_E$. Particularly preferably, the determined second calibration factor $C_E$ is, once the respective instructions are executed, stored together with data describing the pan type, the measurement gas and the desired temperature of the first or the second steady state.

The pan type is typically determined by the material and the size of the pan. Pan types can also differ in their shape and further properties.

Preferably, the data evaluation unit is equipped to evaluate a heat flow to or from a sample in the sample pan based on the differential heat flow signal and/or the sample-side and the reference-side heat flow signals and/or signals indicating the heating power applied to the sample-side respectively the reference-side, in combination with the second calibration factor $C_E$.

In a further embodiment, the data evaluation unit is equipped to access or to receive a conversion factor F, which depends on the pan type and preferably the temperature of the first or the second steady state.

Preferably, the data evaluation unit is equipped to evaluate a heat flow to or from a sample in the sample pan based on the differential heat flow signal and/or the sample-side and the reference-side heat flow signals and/or signals indicating the heating power applied to the sample-side respectively the reference-side, in combination with the conversion factor F and/or the second calibration factor $C_E$.

The self-calibrating differential scanning calorimeter allows the user to profit from the use of the second calibration factor without having to access the uncalibrated raw data and do the calculation by himself or with an external computer.

In most cases, $C_E$ changes only slowly over time and depends mostly on the choice of the pan type, the measurement gas and the temperature. Therefore, storing the determined $C_E$ value makes it possible to reduce the number of calibration measurements and thereby the total calibration time. If the stored data also includes information about the pan type, the measurement gas and the temperature, the user can choose and/or instruct the self-calibrating differential scanning calorimeter to access and to use a stored second calibration factor $C_E$ for the desired measurement conditions, even if they have changed since the last measurement. The measurement conditions comprise in this case the pan type, the measurement gas and the temperature. The user and/or the instructions stored in the memory of the self-calibrating differential scanning calorimeter can specify a tolerance in the measurement conditions which is are intervals in which a stored value of $C_E$ is considered suitable to be used for desired measurement conditions even though the desired measurement conditions differ in the range specified by the intervals from the measurement conditions at which the $C_E$ value in question was determined.

A conversion factor F can be introduced to describe the dependency of the adjustment on the pan type. The factor F can be chosen in such a way that it is independent from the individual sensor arrangement itself.

This allows to provide the user with a set of conversion factor F—values for the available pan types or to provide the conversion factor F together with the pan to which it relates. The conversion factor F can then be used with different sensor arrangement of the same type and in different differential scanning calorimeters of the same type and geometry.

A data evaluation unit which can access or receive the conversion factor F for a desired pan type can reduce the need for calibration measurements even further, as at least in a measurement mode where the heat flow produced by the sample is balanced by a heat flow produced by the local heater arrangement such that there is no differential heat flow signal U, only the conversion factor F is needed the evaluate the desired value of the heat flow to or from the sample.

The evaluation of the desired heat flow caused by the sample is explained in detail with reference to FIG. 2.

Preferably, the heat flow to the sample is determined by using the second calibration factor $C_E$ and the conversion factor F, as the second calibration factor $C_E$ can be determined by the method according to the invention before the measurement is started and the conversion factor F can be provided to the user.

In a preferred embodiment of the self-calibrating differential scanning calorimeter the data evaluation unit can access a first default calibration factor $C_{Hd}$, which depends on the pan type, the measurement gas and the temperature.

The data evaluation unit of this preferred embodiment of the self-calibrating differential scanning calorimeter is preferably further equipped to evaluate a heat flow to or from a sample in the sample pan to be the ratio of the differential heat flow signal, either measured directly or determined to be the difference between the sample-side and the reference-side heat flow signal $U=U_S-U_R$, and first default calibration factor.

Written as a formula, this evaluation is as follows: $P_S=U/C_{Hd}$, whereby $P_S$ denotes the heat flow to or from a sample in the sample pan.

During this measurement, neither the sample-side not the reference-side local heater arrangement applies heating power to the sample-side respectively the reference-side pan support region.

This allows the user to conduct measurements even if there is no time for a proper calibration. Further, it provides the user with the possibility to cross-check the measurements, if he has the impression that the determination of the second calibration factor returned a wrong result which could happen for example due to a technical problem with the local heater arrangements or due to a typo in a calculation.

Preferably, the first default calibration factor $C_{Hd}$ is a first calibration factor which is determined by comparing the differential heat flow—measured as the differential heat flow signal (U)—with a known heat flow P s produced by a reference substance, in the absence of any local heating.

Preferably, the first default calibration factor $C_{Hd}$ at desired measurement conditions is determined by an inter- and/or extrapolation using a set of first calibration factors which are determined by comparing the differential heat flow—measured as the differential heat flow signal (U)—with a known heat flow $P_S$ produced by a reference substance, in the absence of any local heating at different measurement conditions.

The method to determine the conversion factor F can be applied with a common differential scanning calorimeter. However, it is more comfortable for the user to execute it with the self-calibrating differential scanning calorimeter according to the invention.

A first embodiment of a method to determine the conversion factor F with a differential scanning calorimeter comprises the following steps which are preferably executed with the self-calibrating differential scanning calorimeter.

Executing the method to determine the second calibration factor $C_E$ at a first desired temperature whereby the pan comprises a calibration sample which is known to undergo an exothermic or endothermic transition at a transition temperature which is different from the first desired temperature.

Controlling the heat source such that the transition temperature is achieved and the transition of the sample takes place, while no heat is applied by the sample-side or the reference-side local heater arrangement.

Integrating the differential heat flow signal U, during the transition of the calibration sample and comparing this result with the theoretical enthalpy of the transition of the calibration sample. Preferably, this comparison is done by calculating the ratio and stored as a first calibration factor $C_H$ Storing the ratio of the first and the second calibration factor $(C_H/C_E)$ as the conversion factor F, preferably together with for the pan type used for this measurement.

The differential heat flow signal U can be measured either directly or it can be determined by calculating the difference between the sample-side and the reference-side heat flow signal $U=U_S-U_R$ measurement.

As explained above, the second calibration factor $C_E$ uses a known heat flow produced by the local heater arrangement which heats the pan support region for a calibration while the first calibration factor $C_H$ uses a known transition of a calibration sample in a pan arranged on the pan support region for the calibration. Combining both calibration factors allows to determine the conversion factor F which characterizes the thermal resistance between the pan and its surrounding.

In a further embodiment, the first desired temperature equals the transition temperature and $C_E$ is determined by using the reference-side local heater arrangement and the reference pan after the transition of the calibration sample arranged in the sample pan on the sample-side has taken place. Especially if the heating power applied to the reference-side pan support region is similar to the heating power produced by the sample during its transition, this allows to determine the first and the second calibration factor $C_E$ and $C_H$ as well as the factor F at even more similar temperatures.

A second embodiment of a method to determine the conversion factor F with a common differential scanning calorimeter, preferably with the self-calibrating differential scanning calorimeter, comprises the following steps: executing the method to determine a second calibration factor $C_E$ at a third temperature; accessing the first default calibration factor $C_{Hd}$ for the pan type, the measuring gas and preferably the third temperature; storing the ratio of the first default and the second calibration factor $(C_{Hd}/C_E)$ as the conversion factor F, preferably together with for the pan type used for this measurement.

The steps of this method are preferably executed with the self-calibrating differential scanning calorimeter.

This allows to determine the conversion factor F without a calibration sample. This method can be used, if a measurement should be done for a pan type for which there are no F values available. If this method is used on a common differential scanning calorimeter, the step of accessing the first default calibration factor may involve a database access or the use of an external computer program by a user.

A third embodiment of a method to determine the conversion factor F for a given pan type to be arranged in a given furnace at a sample-side pan support region, to be used by a differential scanning calorimeter, which uses this pan type, the furnace as temperature-controlled heat source, and the sample-side pan support region, comprises the steps of: estimating, preferably by means of a computer simulation, a geometric factor $g_L$ which is the thermal resistance between a pan of the given pan type arranged on the sample-side pan support region and the furnace, assuming the thermal conductivity of the gas equals 1; and estimating the value of the conversion factor F based on the geometric factor $g_L$ and the radius r of the bottom of the pan type.

Preferably, the method is used to determine the conversion factor F of a self-calibrating differential scanning calorimeter which uses this pan type, the furnace as temperature-controlled heat source, and the sample-side pan support region.

Preferably, the height d of the region between the pan and the pan support region is also used to estimate the value of the conversion factor F according to this embodiment.

Preferably, the thermal resistance between the pan and the furnace $R_L$ is determined by the measurement gas with a thermal conductivity $\lambda$, to be:

$$R_L = \frac{g_L}{\lambda}$$

whereby $g_L = R_L\lambda$ is a geometric factor describing an effective thickness of the measurement gas between the pan and the furnace.

The thermal resistance between the pan and the pan support region is also determined by the measurement gas and can be approximated to be a cylinder with the radius r of the pan bottom and a hight d of typically a few microns, preferably between 10 and 30 μm, most preferably between 15 and 17.5 μm:

$$R_K = \frac{d}{\pi r^2 \lambda}$$

The conversion factor F is the ratio of the first and the second calibration factor $C_H/C_E$. The first calibration factor $C_H$, is determined with a known heat source or sink inside the pan. The second calibration factor $C_E$, is determined with the known heat source heating the pan support region which is below the pan. As explained below, the according to the model of FIG. 2, F represents a ratio of thermal resistances:

$$F = \frac{R_L}{R_L + R_K}.$$

Using the above mentioned expressions for these resistances, the thermal conductivity value cancels out and make F depend only on geometric factors:

$$F = \frac{g_L}{g_L + g_K} \text{ with } g_K = \frac{d}{\pi r^2}.$$

Therefore, by estimating the effective thickness of the measurement gas between the pan and the furnace which is essentially $g_L$, the conversion factor F can be determined. To determine $g_L$ the thermal resistance can be calculated, for example with a computer simulation, assuming the thermal conductivity $\lambda=1$ in the units used for the calculation. It is also possible to run such a simulation with another value for the thermal conductivity and to divide the result by this value.

This method allows the user to estimate a calibration for pans with unknown factor F without the need for a measurement.

Such an estimate of the conversion factor F can be combined with the second calibration factor $C_E$ determined by the method explained above. This eliminates the need for a calibration sample at all. Preferably this third embodiment is used to provide F values for pans for which there are no suitable values derived with the help of calibration samples.

Evaluating the heat flow to or from a sample in the sample pan using a differential scanning calorimeter, preferably a self-calibrating differential scanning calorimeter, comprises preferably the steps of: placing the sample in the sample pan of a pan type, placing the sample pan on the sample-side pan support region, placing the empty reference pan of the same pan type on the reference-side pan support region; controlling the temperature-controlled heat source such that it follows a desired temperature program; measuring or determining the differential heat flow signal while no heat is applied by the sample-side or the reference-side local heater arrangement; estimating the heat flow to or from the sample using the differential heat flow signal U, the conversion factor F and the second calibration factor $C_E$, whereby the conversion factor F is chosen depending on the pan type and while the second calibration factor $C_E$ is chosen depending on the pan type, the measurement gas and the temperature of the measurement.

Preferably the chemistry and/or the conditions of the measurement gas in the volume surrounding the sample and the reference pan are adapted to a desired value.

In this case, the estimate for the heat flow is:

$$P_S = \frac{U}{FC_E}$$

This estimate of the heat flow can be derived with high precision without the need for a calibration sample, as the second calibration factor $C_E$ uses the local heater arrangement and as the conversion factor F can be derived from tables, other data sources or computer simulations and/or theoretical calculations.

In a preferred embodiment of the method of evaluating the heat flow to or from a sample in the sample pan using a differential scanning calorimeter, the second calibration factor $C_E$ is determined with the method to determine a second calibration factor $C_E$ without removing the sample pan or the reference pan between the determination of $C_E$ and the evaluation of the heat flow to or from the sample according to the invention.

This has the advantage that the contact between the pan support region and the pans located thereon is the same for the determination of the second calibration factor $C_E$, which is used for the calibration, and the measurement. This improves the quality of the calibration.

In a further method to evaluate the heat flow to or from a sample in the sample pan, a differential scanning calorimeter, preferably a self-calibrating differential scanning calorimeter, is used. The method comprises an evaluation step and at least one calibration step and a measurement step. The at least one calibration step and the measurement step are both conducted using the same pan type and the same measurement gas.

The calibration step comprises the following steps.

Placing the sample pan which comprises a calibration sample on the sample-side pan support region and an empty reference pan of the same type on the reference-side pan support region. The calibration sample is known to undergo an exothermic or endothermic transition at a transition temperature.

Controlling the heat source such that the transition temperature is achieved and that the transition of the calibration sample takes place while no heat is applied by the sample-side or the reference-side local heater arrangement.

Integrating the differential heat flow signal U during the transition of the calibration sample and comparing this result with the theoretical enthalpy of the transition of the calibration sample, whereby this comparison is preferably stored as a first calibration factor $C_H$.

The measurement step comprises the following steps.

Placing the sample pan which comprises a sample of the material of interest on the sample-side pan support region and an empty reference pan of the same type on the reference-side pan support region.

Controlling the temperature-controlled heat source such that it follows a desired temperature program while no heat is applied by the sample-side or the reference-side local heater arrangement.

Observing the differential heat flow signal.

The evaluation step comprises the step of: estimating the heat flow to or from the sample of the material of interest from the differential heat flow signal and the result of the comparison of the calibration step, which is preferably stored as first calibration factor $C_H$.

Preferably, there is more than one calibration step. In this case each calibration step is conducted at a different transition temperature and whereby the transition temperatures are preferably chosen to be within a temperature range covered by the temperature program of the measurement step.

Preferably the chemistry and/or the conditions of the measurement gas in the volume surrounding the sample and the reference pan are adapted to a desired value.

Preferably, this embodiment of the method to evaluate the heat flow comprises further calibration steps at which the method to determine a second calibration factor $C_E$ is executed at temperatures which equal the transition temperatures used to determine $C_H$ in the one or more calibration step. Preferably, F values obtained from calculating the ratio $C_H/C_E$ at the different temperatures are added to a memory which is accessible to the data evaluation unit.

A further method to evaluate the heat flow to or from a sample in the sample pan using a differential scanning calorimeter, preferably a self-calibrating differential scanning calorimeter comprises the steps of: placing the sample in the sample pan of a pan type, placing the sample pan on the sample-side pan support region, placing the empty reference pan of the same pan type on the reference-side pan support region; controlling the temperature-controlled heat source such that it follows a desired temperature program; controlling the sample-side and the reference-side local heater arrangements such that the absolute value of the differential heat flow signal is minimized; measuring or determining the differential heating power $P_{el}$, preferably from the heating power of the sample-side and the reference-side local heater arrangements, as well as the differential heat flow signal U; estimating the heat flow to or from the sample using the differential heat flow signal U and the differential heating power $P_{el}$, the conversion factor F and the second calibration factor $C_E$, whereby the conversion factor F and the second calibration factor $C_E$ are chosen depending on the pan type, the measurement gas and the temperature of the measurement.

Preferably the chemistry and/or the conditions of the measurement gas in the volume surrounding the sample and the reference pan are adapted to a desired value.

As explained with reference to FIG. 2, the heat flow to or from the sample can be calculated from the measured values U and $P_{el}$ using the values of the second calibration factor $C_E$ and the conversion factor F as follows:

$$P_S = \frac{1}{F}\left(\frac{U}{C_E} - P_{el}\right)$$

In the case at hand, U which is the differential heat flow signal, is minimized. In an ideal case, this would result in U=0 and only the conversion factor F would be needed to derive the result. However, the control might be to slow which results in a relevant differential heat flow signal U and therefore in the need to consider the second calibration factor $C_E$ in the evaluation of the result, too.

As explained above, the conversion factor F is a geometric property of the measurement set-up and independent of the sensor arrangement used for the measurement in place. Therefore, the heat flows determined by this method are even more independent from the instrument with which they were determined.

The differential heating power $P_{el}$ can have a positive or a negative value: If the sample produces heat, heat is produced on the sample side and the reference side local heater arrangement is controlled to compensate it. On the other hand, if the sample requires heat for the transition, the sample side local heater arrangement is controlled to start producing heat to compensate for this heat sink.

In a preferred embodiment of the further method to evaluate the heat flow, the differential heating power $P_{el}$ is controlled by a proportional controller with a gain $k_p$ to minimize the absolute value of the differential heat flow signal U.

If the differential heating power $P_{el}$ is chosen to be the sample side value minus the reference side value, i.e. $P_{el}=P_{el,s}-P_{el,r}$ and if U is the differential heat flow signal, the proportional controller adapts either the sample side or the reference side heater such that $P_{el}=-k_pP_{DSC}$ with $$P_{DSC} = \frac{U}{C_H} \text{ or } \frac{U}{FC_E}.$$

This choice of a proportional controller allows to minimize U in a particular useful timescale. As the measurements which take place during a time where the differential heat flow signal is still significantly different from 0 can nevertheless be used, a continuous approach to the desired value is preferable over a control which is optimized for short timescales.

Preferably, the gain depends on the ratio of a gain constant k and the default first calibration factor $C_{Hd}$, whereby the value of the gain constant k is chosen depending on the desired time resolution of the measurement and whereby the value of the default first calibration factor $C_{Hd}$ is chosen depending on the temperature, the pan type and the measurement gas.

A gain chosen in this way allows to user to work with the same desired time resolution at different measurement conditions. The measurement conditions are for example the temperature, the pan type and the measurement gas.

Particular preferably, the heating power of the sample-side and the reference-side local heater arrangements are controlled by controlling the voltage and/or the current supplied to local heater arrangements in the form of electrical heater arrangements. Thereby, the electrical resistances $R_S$, $R_R$ of the electrical heater arrangements which are determined by the preferred embodiment of the method to determine a second calibration factor $C_E$ are considered.

As this method allows to determine the electrical resistances at different temperatures, the results are particular useful to determine the voltage or current needed to archive the desired differential heating power ($P_{el}$).

In a preferred embodiment of the further method to evaluate the heat flow to or from a sample in the sample pan, the second calibration factor $C_E$ is determined by the method to determine a second calibration factor $C_E$ without removing the sample pan or the reference pan between the determination of $C_E$ and the evaluation of the heat flow to or from a sample in the sample pan.

If the local heater arrangements are electrical heater arrangements, their electrical resistances $R_S$, $R_R$ are preferably determined during the determination of the second calibration factor $C_E$.

Using this embodiment allows to consider the actual placement of the pans which can improve the results.

A further embodiment of evaluating the heat flow to or from a sample in the sample pan using a differential scanning calorimeter, preferably a self-calibrating differential scanning calorimeter, comprises at least one calibration step and a measurement step. The at least one calibration step and the measurement step are both conducted using the same pan type and the same measurement gas. An evaluation step is conducted after the calibration and the measurement step.

The calibration step may include the following steps.

Placing the sample pan which comprises a calibration sample on the sample-side pan support region. The calibration sample is known to undergo an exothermic or endothermic transition at a transition temperature. An empty reference pan of the same type is placed on the reference-side pan support region.

Determining a second default calibration factor $C_{Ed}$, preferably by the method to determine a second calibration factor $C_E$ or by accessing a previously stored value of the second calibration factor $C_E$ for the given conditions.

Controlling the heat source such that the transition temperature is achieved and the transition of the calibration sample takes place while the electrical heaters are controlled to minimize the differential heat flow signal.

Measuring or determining the differential heating power of the sample-side and the reference-side local heater arrangements $P_{el}$ as well as the differential heat flow signal U during the transition of the sample.

Integrating, over the time of the transition of the sample, the difference ($U-P_{el}C_{Ed}$) between: the differential heat flow signal U, and the product of the second default calibration factor $C_{Ed}$ with the differential heating power $P_{el}$ Comparing this integral with the theoretical enthalpy of the transition of the calibration sample, whereby this comparison is preferably stored as a first calibration factor $C_H$ together with the default second calibration factor $C_{Ed}$ used in the integral.

Preferably, the comparison between the integral of the difference between the differential heat flow signal and the product of the second default calibration factor with the differential heating power and the theoretical enthalpy of the transition of the calibration sample is done by a mathematical operation such as calculating their quotient.

The measurement step comprises the steps of: placing the sample pan which comprises a sample of the material of interest on the sample-side pan support region and an empty reference pan of the same pan type on the reference-side pan support region; controlling the temperature-controlled heat source such that it follows a desired temperature program; controlling the sample-side and the reference-side local heater arrangements such that the absolute value of the differential heat flow signal is minimized; and measuring or determining the differential heating power $P_{el}$ as well as the differential heat flow signal U.

The evaluation step comprises the step of: estimating the heat flow to or from the sample using the differential heating power $P_{el}$, the differential heat flow signal U, the default second calibration factor $C_{Ed}$ and the result of the comparison of the calibration step, preferably the first calibration factor $C_H$.

In this case, the heat flow to or from a sample in the sample pan can be calculated as follows:

$$P_S = \frac{U - P_{el}C_{Ed}}{C_H}.$$

In a preferred embodiment, in the method of evaluating the heat flow to or from a sample in the sample pan of a pan type surrounded by a measurement gas, the conversion factor F is chosen depending on the pan type and preferably the temperature of the temperature-controlled heat source. The measurement gas and its properties are preferably considered by choosing a second calibration factor $C_E$ which was determined with a pan of the pan type, the measurement gas and preferably the temperature of the temperature-controlled heat source.

The choice of the measurement gas and its properties such as its density or pressure determine the thermal conductivity of it. As can be seen in the explanations of the theoretical method to determine F, the thermal conductivity of the gas occurs in both terms: The thermal resistance between the sample support region and the pan $R_k$ as well as in the thermal resistance between the pan and the temperature-controlled heat source $R_L$. As only the ratio of these two resistances occurs in F, the thermal conductivity of the measurement gas cancels out and F is independent of the measurement gas at hand as long as thermal conductivity is the dominating heat transfer process in the measurement gas.

As the method to determine $C_E$ is quite fast and does not require a particular sample, choosing F depending on the pan type and preferably the temperature while allowing $C_E$ to take care of the impact of the measurement gas, there is no need for additional sensors or additional user input to determine the measurement gas and its conditions: The measurement can simply start with a $C_E$ determination which is then used for the evaluation of the subsequent measurement results.

In a preferred embodiment of a self-calibrating differential scanning calorimeter the sensor arrangement is arranged in a volume which is surrounded by the same temperature-controlled heat source. Preferably, a single sensing unit comprises the sensor arrangement.

Such a self-calibrating differential scanning calorimeter is suitable to be used in the method to determine a second calibration factor $C_E$. This arrangement makes it particularly easy to ensure the symmetry between the sample-side and the reference side.

In another embodiment, the sample-side pan support region, the sample-side measurement region and the sample-side local heater arrangement are parts of a first sensing unit. The reference-side pan support region, the reference-side measurement region and the reference-side local heater arrangement are parts of a second sensing unit. The sensor arrangement comprises in this embodiment the first and the second sensing unit.

In a preferred embodiment, the first and the second sensing unit of this embodiment are arranged in the volume surrounded by the same temperature-controlled heat source.

In another preferred embodiment, the first sensing unit is arranged in a first volume which is surrounded by a first temperature-controlled heat source and the second sensing unit is arranged in a second volume which is surrounded by a second temperature-controlled heat source. The first and the second temperature-controlled heat sources are preferably connected in such a way that their temperature is the same.

In a preferred embodiment of a self-calibrating differential scanning calorimeter the single, first and/or second sensing unit is arranged such that it touches the temperature-controlled heat source with surfaces opposite of the pan support regions. This arrangement ensures a thermal contact between the temperature-controlled heat source and the respective sensing unit while still allowing to exchange of the sensing unit without modifications to the temperature-controlled heat source.

In another preferred embodiment, the single, first and/or second sensing unit is arranged such that its edges touch the temperature-controlled heat source while the surfaces opposite of the pan support regions are exposed to the volume surrounded by the temperature-controlled heat source.

DETAILED DESCRIPTION OF EXEMPLARY EMBODIMENT(S)

Figure 1:
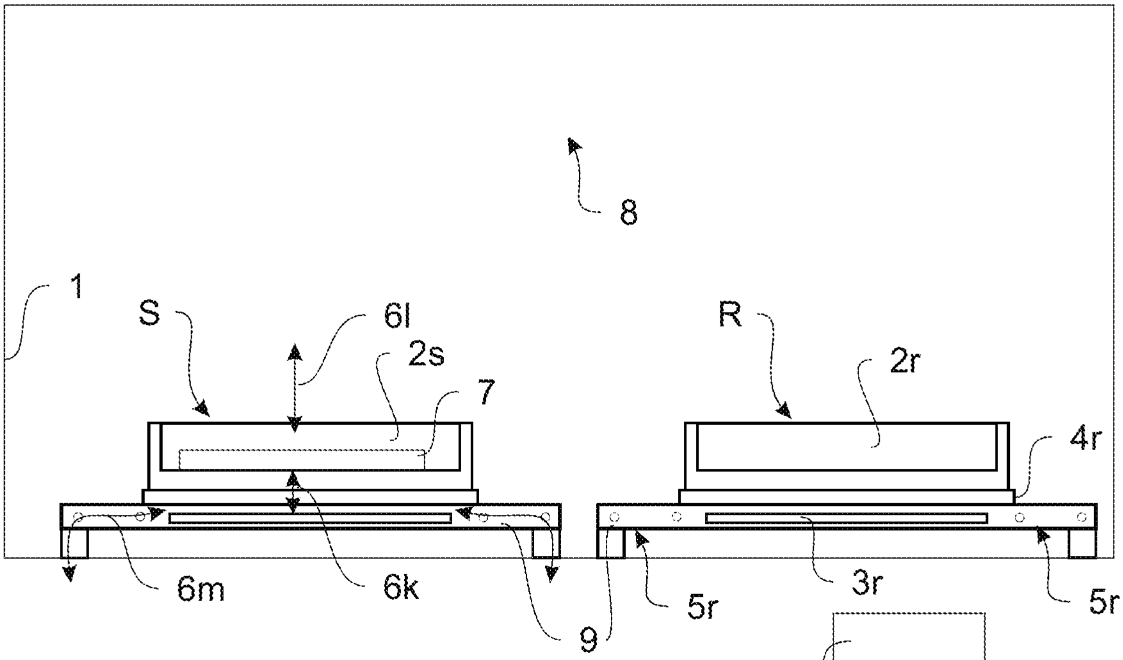
FIG. 1 is a highly schematic illustration of a self-calibrating differential scanning calorimeter.

The illustration of FIG. 1 is a highly schematical partial cross-section of a self-calibrating differential scanning calorimeter in a plane that extends normal to the horizontally extending pan support regions 4*r*. As an example of a temperature-controlled heat source, a furnace 1 forming a heat source whose temperature $T_F$ is controlled in accordance with a predetermined temperature program is shown and appears as a rectangle surrounding a volume enclosing the sensor arrangement. The sensor arrangement comprises a sample side S and a reference side R which differ only by the presence of a sample 7 inside the pan 2*s* of the sample side S. The self-calibrating differential scanning calorimeter comprises further a data evaluation unit 10.

To avoid crowded figures, most of the reference signs are only shown at the reference side of the sensor arrangement, but the respective structure is present at the sample side too. Similarly, the heat flows are illustrated at the sample side but apply the same way to the reference side.

The sensor arrangement 9 comprises the sample-side and reference-side pan support regions 4*r*, the sample-side and a reference-side measurement regions comprising thermoelectric arrangements operative to output at least one thermoelectric voltage signal representative of a heat flow 6*m* across a measurement region 5*r* surrounding the respective pan support region 4*r*. The sensor arrangement 9 comprises further the sample-side and a reference-side local heater arrangements in the form of electrical heater arrangements 3*r*.

A pan 2*s*, 2*r* adapted to receive therein a sample 7, which is the substance to be analysed, is supported by the thermally conductive pan support region 4*r* which is part of the sensor arrangement 9. The sensor arrangement 9 is in thermal contact with the furnace 1. The measurement regions 5*r* are arranged in such a way that the mechanical contact between the furnace 1 and the sensor arrangement 9 is only established by one end of the measurement regions 5*r* while the other end of the measurement regions 5*r* is a region in thermal contact with the electrical heater arrangement 3*r* and the pan support regions 4*r*.

A thermally conductive member, formed by the measurement regions 5*r*, thereby establishes a heat flow path 6*m* between the furnace 1 and the pan support region 4*r*. This heat flow path 6*m* will be called measurement heat flow path 6*m* in the following and its properties are denoted with a subscript "m".

Circles drawn in the measurement region 5 symbolize thermoelectric junctions located at turning regions of a thermoelectric arrangement meandering around the pan position. Due to this configuration, the thermoelectric arrangement generates a thermoelectric voltage signal representative of the measurement heat flow 6*m* flowing thereacross. This thermoelectric voltage signal is an embodiment of a heat flow signal. The thermoelectric arrangement is an embodiment of a measurement region sensor.

The electrical heater arrangements 3*r* are located beneath the respective pan support region 4*r*. A straight arrow symbolizes heat flow from the region of the electrical heater arrangement 3*r* towards the respective pan 2*r*, 2*s*. This heat flow path 6*k* will be called contact heat flow path 6*k* in the following and its properties are denoted with a subscript "k".

Besides the measurement heat flow 6*m* and the contact heat flow 6*k*, the respective pan 2*s*, 2*r* is in thermal contact with the furnace 1 via the measurement gas 8 which fills the volume between the sensor arrangement 9 and the pans 2 and the furnace 1. This heat flow path 6*l* is also indicated by a straight arrow. It will be called gas heat flow path 6*l* in the following and its properties are denoted with a subscript "l".

In a typical differential scanning calorimeter, the overall arrangement is on both, the sample and the reference side, axially symmetric with respect to a central axis normal to the respective pan support region 4*r* so that both, the sample side and the reference side pan support regions 4*r* have a circular outer circumference and the respective thermoelectric arrangement meanders between an inner concentric circle of thermoelectric junctions and an outer concentric circle of thermoelectric junctions forming thereby sample-side and reference side measurement regions 5*r* which appear in the projection ring-shaped and surrounding the respective pan support region.

Figure 2:
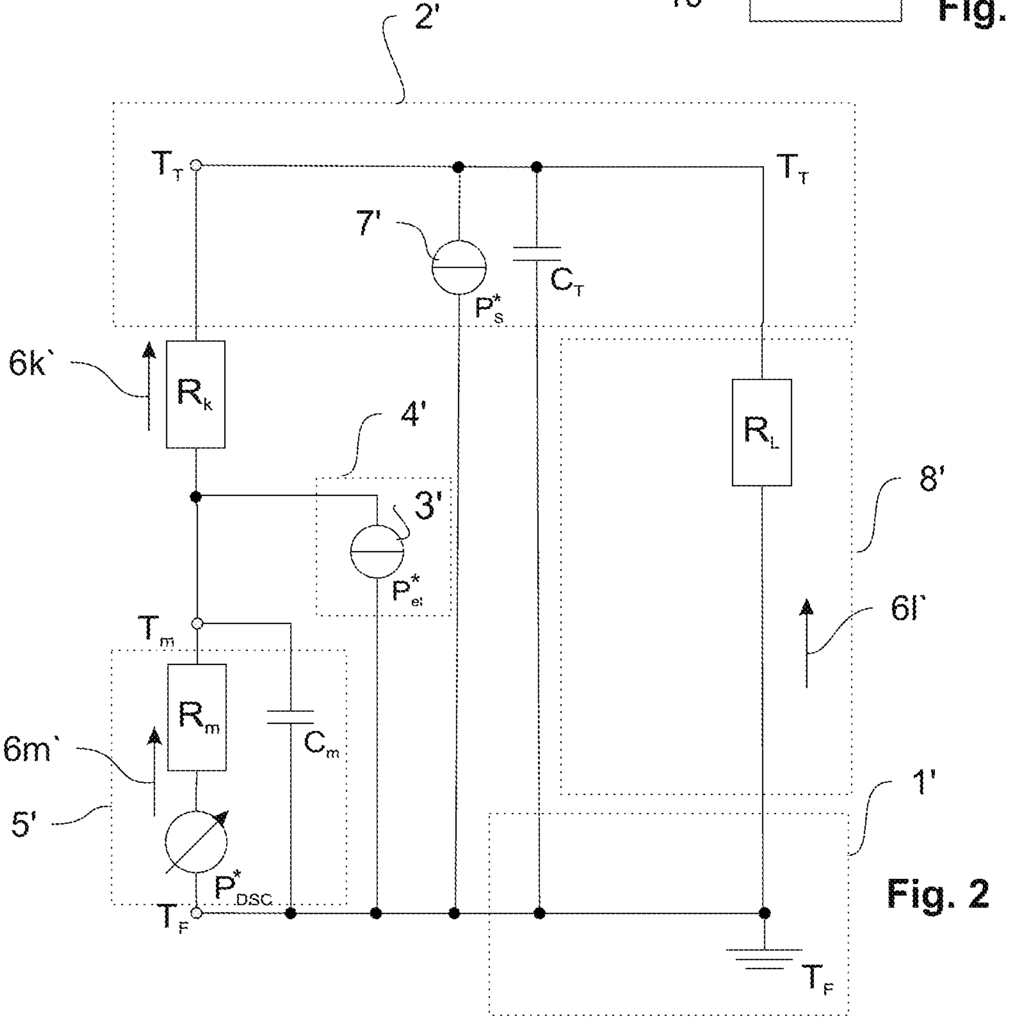
FIG. 2 is a corresponding thermal circuit model.

Each of the sample-side and reference-side portions of the calorimeter may be modelled as the circuit diagram illustrated in FIG. 2. The model uses the analogy between electrical and thermal systems: Temperature differences are modelled as voltages; heat flows are modelled as currents. Thermal resistances are modelled as electrical resistances while heat capacities are modelled as electrical capacitors. A heater producing heating power is modelled as a current source. A temperature-controlled heat source has a similar function as a ground in an electric circuit.

The representations of the different parts of the self-calibrating differential scanning calorimeter are denoted with dashed reference numbers of the respective parts.

In this circuit diagram $T_F$ indicates the temperature of the furnace 1' and $T_T$ the temperature of the sample/reference pan 2'. Tm indicates the temperature of the pan support region 4'. The measurement heat flow 6*m'* between the furnace 1' and the pan support region 4' experiences a measuring resistance $R_m$ and is driven by the temperature difference between the furnace temperature level $T_f$ and pan support region temperature level $T_m$. Parallelly connected thereto is the heat capacity $C_m$ of the measurement region 5'.

Thermal contact resistance $R_k$ characterizes the contact heat flow between the pan support region with the temperature $T_m$ and the pan with the pan temperature $T_T$. This thermal contact resistance $R_k$ is dominated by an unavoidable gap between the pan support region and the pan deposited thereon. It is the contact heat flow path 6*k'* which experiences the contact resistance $R_k$.

Gas resistance $R_L$ characterizes the gas heat flow path 6*l'* between furnace 1' with the furnace temperature $T_f$ and the pan with the pan temperature $T_T$. The gas resistance $R_L$ depends on the geometry of the calorimeter and the measurement gas 8'. Connected in parallel to the gas resistance $R_L$ is the heat capacitance $C_T$ of sample/reference pan 2'.

$P^*_{el}$ represents the flow of heat supplied to the sample/reference position or the heating power created by energizing the electrical heater arrangement 3'. $P_s$ symbolizes heat flow caused by a sample 7' received within the sample pan 2s. $P^*_{DSC}$ measures the measuring heat flow 6m' through the measuring resistance $R_m$.

The heat flow signal $U_s$ respectively $U_r$ or a differential heat flow signal $U=U_s-U_r$ generated by the respective or both measurement regions, preferably by thermoelectric arrangements, is one of the raw measurement results and the basis to determine the desired properties of the sample 7'. Another raw measurement result can be the heat flow $P^*_{el}$ produced by energizing the electrical heater arrangement 3'.

The model shown in FIG. 2 can be used for both, the sample and the reference side. The two sides differ only by the fact that there is no sample of the reference side and that therefor $P^*_S=0$ on the reference side while $P^*_S=P_S$ on the sample side.

In the following, $P_{el,s}$ and $P_{el,r}$ refer to the heating power produced by energizing the electrical heater arrangement 3' at the sample respectively at the reference side, i.e., $P^*_{el}=P_{el,r}$ on the reference side and $P^*_{el}=P_{el,s}$ on the sample side. In the following $P_{el}$ should denote the differential heating power produced by energizing the electrical heater arrangements, i.e., $P_{el}=P_{el,s}-P_{el,r}$.

In the following, $P_{DSCs}$ and $P_{DSCr}$ refer to heat flow at the sample respectively at the reference side, i.e., $P^*_{DSC}$=PDSCr on the reference side and $P^*_{DSC}=P_{DSCs}$ on the sample side. In the following $P_{DSC}$ should denote the differential heat flow, i.e., $P_{DSC}=P_{DSCs}-P_{DSCr}$.

The following equations $$C_T\dot{T}_T = -\frac{T_T - T_m}{R_k} - \frac{T_T - T_F}{R_L} + P_S^* \quad \text{Equation 1}$$

$$C_m\dot{T}_m = \frac{T_T - T_m}{R_k} - \frac{T_m - T_F}{R_m} + P_{el}^* \quad \text{Equation 2}$$

describe the heat balance in this thermal circuit model. In the steady state the time derivatives of the furnace and sample-side pan support region temperatures $T_T$ and $T_m$, respectively, are zero. Further considering that according to Ohm's Law $$T_m - T_F = P_{DSC}^* R_m \quad \text{Equation 3}$$

the above equations (1) -(3) may be combined to yield $$P_S^* = P_{DSC}^*\left(1 + \frac{R_m + R_k}{R_L}\right) - P_{el}^*\left(1 + \frac{R_k}{R_L}\right) \quad \text{Equation 4}$$

In one embodiment of the invention, the sample-side and the reference-side electrical heater arrangement are controlled to minimize the differential measurement heat flow. If this control is perfect, $P_{DSC}=P_{DSC,s}-P_{DSC,r}=0$. As there is no sample on the reference side, it cannot produce any heat and therefore, $$P_S^* = 0$$

on the reference side. These relationships allow equation (4) to be expressed using the differential heating power $P_{el}$ of the electrical heater arrangements ($P_{el}=P_{el,s}-P_{el,r}$):

$$P_s = -P_{el}\left(1 + \frac{R_k}{R_L}\right) \quad \text{Equation 5}$$

In another embodiment of the invention, neither the sample-side nor the reference-side electrical heater arrangements are energized. In this case $$P_{el}^* = P_{el,s} = P_{el,r} = 0.$$

As there is no sample on the reference side, it cannot produce any heat and therefore, $$P_S^* = 0$$

on the reference side. These relationships allow equation (4) to be expressed using the differential heat flow ($P_{DSC}=P_{DSC,s}-P_{DSC,r}$):

$$P_S = P_{DSC}\left(1 + \frac{R_m + R_k}{R_L}\right) \quad \text{Equation 6}$$

In a further embodiment of the invention, the sample-side and the reference-side electrical heater arrangements are energized, but not sufficient to reduce the differential heat flow through the measurement regions to be negligibly small. In these cases, equation (4) yields:

$$P_S = P_{DSC}\left(1 + \frac{R_m + R_k}{R_L}\right) - P_{el}\left(1 + \frac{R_k}{R_L}\right) \quad \text{Equation 7}$$

Finally, in the absence of heat produced by a sample $$(P_S^* = 0 \text{ on both, sample and reference side})$$

but in the presence of heating power produced by the local heating arrangement only, on either the reference or the sample side, the following relationship result from equation (7):

$$P_{DSC}\left(1 + \frac{R_m + R_k}{R_L}\right) = P_{el}\left(1 + \frac{R_k}{R_L}\right) \quad \text{Equation 8}$$

$$\text{or } P_{el} = P_{DSC}\left(\frac{R_l + R_m + R_k}{R_L + R_k}\right)$$

In order to evaluate the expression (5) to (7) however, calibration factors are needed to describe on the one hand the different thermal resistances terms and on the other hand, link the measured or determined differential heat flow signal U to the differential heat flow $P_{DSC}$.

The first calibration factor may be written as the ratio of the differential heat flow signal U detected while measuring a transition of an established reference substance as a sample and the know heat flow value $P_s$ of this established reference substance at the given measurement conditions. The electrical heater arrangements are not used during this measurement. This first calibration factor is defined to be $$C_H = \frac{U}{P_S} \quad \text{Equation 9}$$

Similarly, the second calibration factor may be written as the ratio of the differential heat flow signal U measured while producing a known differential heat flow $P_{el}$ with the electrical heater arrangements and this known differential heat flow $P_{el}$. There is no heat produced by a sample during this measurement. This second calibration factor is defined to be:

$$C_E = \frac{U}{P_{el}} \quad \text{Equation 10}$$

By applying the mathematical relation of equation (6), which describes a situation in the absence of heating power by the local heaters, the first calibration factor $C_H$ may therefore be expressed as follows:

$$C_H = \frac{U}{P_{DSC}}\left(1 + \frac{R_m + R_k}{R_L}\right)^{-1} = \alpha\left(1 + \frac{R_m + R_k}{R_L}\right)^{-1} \quad \text{Equation 11}$$

Whereby the conversion factor between the measured differential heat flow signal, for example a thermoelectric voltage signal, and the heat flow is $$\frac{U}{P_{DSC}} = \alpha.$$

By applying the mathematical relation of equation (8), which describes a situation in the absence of heating power by a sample, the second calibration factor $C_E$ may therefore be expressed as follows:

$$C_E = \frac{U}{P_{DSC}}\left(\frac{R_l + R_m + R_k}{R_L + R_k}\right)^{-1} = \alpha\left(\frac{R_l + R_m + R_k}{R_L + R_k}\right)^{-1} \quad \text{Equation 12}$$

Expressions (11) and (12) show that the first and the second calibration factor depend on the details of the measurement region and the sensor arrangement which are characterized by the thermal resistance of the measurement region $R_m$ and by the conversion factor α.

The ratio F of the two calibration factors however, is independent of the measurement region and the sensor arrangement with which it was determined and depends only on the ratio of the contact resistance $R_k$ and the gas resistance $R_L$:

$$F = \frac{C_H}{C_E} = \left[1 + \frac{R_k}{R_L}\right]^{-1} \quad \text{Equation 13}$$

This independence from the sensor arrangement allows the factor F to be determined for a set of likely measurement conditions with one differential scanning calorimeter of a given type and to reuse the data for other instruments of the same type or for the same instrument but after an exchange of the sensor arrangement.

As the contact resistance is dominated by the resistance of a thin gas layer between the pan and the pan support region and as this gas it the measurement gas which is responsible for the gas resistance, the specific heat conductivity of the measurement gas cancels out of the fraction $$\frac{R_k}{R_L}$$

and F can be approximately be regarded as a number describing the geometry of the pans inside the furnace. This allows F to be calculated theoretically, for example with a computer simulation.

Further, this observed independence from the sensor arrangement allows to use the same value of F for different measurements conducted with the same type of pan. To adapt the calibration to different temperatures and different measurement gases, the second calibration factor $C_E$ can be determined by the use of the electrical heater arrangement on one side of the sensor arrangement.

In contrast to $C_H$, determining $C_E$ does not require a reference substance. $C_E$ can therefore be determined for essentially every desired temperature while the temperatures at which $C_H$ can be determined are limited to the transition temperatures of the known reference substances. As F is approximately independent of the temperature, the use of $C_E$ and F allows to interpolate $C_H$ values for temperatures at which $C_H$ cannot be measured directly.

To evaluate the heat flow to or from a sample, using the first and the second conversion factor and the adjustment factor F, the combination of equations (7), (11) and (13) results in:

$$P_S = \frac{U}{C_H} - \frac{P_{el}}{F}$$

This can be rewritten to require only the knowledge of $C_E$ and F:

$$P_S = \frac{U}{FC_E} - \frac{P_{el}}{F}$$

The user may choose if the uses the electrical heater arrangement during the measurement, if he uses the electrical heater arrangement controlled to minimize the absolute value of the differential heat flow signal U or if he uses the electrical heater arrangement not at all. Depending on this choice, U or $P_{el}$ may be set to 0 or they may need to be measured and considered. In a preferred embodiment F is chosen based on the pan type and $C_E$ is determined before or after the measurement of the sample, thereby allowing a precise adaption to the temperature at which the measurement will take place or should take place and at the measurement gas and its conditions during the measurement.

The example illustrates the calculations and the definitions of the calibration factors with formulas in a readable format. In the implementation of the use of F and the determination of $C_E$ in a self-calibrating differential scanning calorimeter, the calculations may vary for example by providing intermediate results such as calculating the measurement heat flow $P_{DSC}$ from the measured heat flow signal U and using these $P_{DSC}$ values instead of U to determine the heat flow to or from the sample. Further, the reciprocals of the first and the second calibration factor and/or of F can be used to realize the invention. Further variations are possible in the choice of the signs for the differential quantities. Therefore, the second calibration factor is preferably any calibration factor which is determined by applying differential heating power to the pan support regions by the use of local heater arrangements and comparing this value to the measured differential heat flow signal U. Further, the conversion factor F is preferably any factor which characterizes the ratio of the thermal contact resistance and the thermal gas resistance.

List of Reference Signs

1 furnace
2 pan (s: sample, r:reference)
3 electrical heater arrangement (s: sample, r:reference)
4 pan support region (s: sample, r:reference)
5 measurement region with thermoelectric junctions
6 heat flow path
6*m* measurement heat flow path,
6*k* contact heat flow path
6*l* gas heat flow path
7 sample
8 measurement gas
9 sensor arrangement
10 data evaluation unit

What is claimed is:

1. A method for determining a second calibration factor ($C_E$) of a differential scanning calorimeter, wherein the differential scanning calorimeter comprises:

a. a temperature-controlled heat source; and b. a sensor arrangement, whereby the sensor arrangement comprises:

i. sample-side and reference-side pan support regions adapted to receive thereon, in heat conductive contact therewith, a bottom region of a sample pan and a reference pan, respectively;

ii. sample-side and reference-side measurement regions, surrounding the sample-side and the reference-side pan support regions, respectively, and 1. a sample-side and a reference-side measurement region sensor operative to output a differential heat flow signal (U) representative of a difference between heat flowing across the sample-side and reference-side measurement regions; and/or 2. a sample-side measurement region sensor operative to output a sample-side heat flow signal ($U_S$) representative of the heat flowing across the sample-side measurement region and a reference-side measurement region sensor operative to output a reference-side heat flow signal ($U_R$) representative of the heat flowing across the reference-side measurement region; and iii. a sample-side and a reference-side local heater arrangement adapted to apply a heating power to the sample-side and the reference-side pan support regions, respectively;

whereby a sample pan of a desired pan type is arranged on the sample-side pan support region and a reference pan of the same desired pan type is arranged on the reference-side pan support region, whereby a volume surrounding the sample pan and the reference pan is filled with a desired measuring gas;

wherein said the method comprises the steps of:

a. creating a first steady state situation of a desired temperature by use of the heat source;

b. once the first steady state is reached, applying heating power to either the sample-side pan support regions or to the reference-side pan support region by the use of the respective local heater arrangement such that a second steady state temperature is reached; and c. determining the second calibration factor ($C_E$) based on the ratio of:

i. the differential heat flow signal (U), either measured directly or determined to be the difference between the sample-side and the reference-side heat flow signal ($U=U_S-U_R$); and ii. the differential heating power, which is the difference between the heating power applied to the sample-side and the heating power applied to the reference-side, during the second steady state.

2. The method of claim 1, wherein:

a. the sample-side and the reference-side local heater arrangements are electrical heater arrangements; and b. the heating power applied to the sample-side and the reference-side local heater arrangements, respectively, is determined by a measurement of an electrical voltage and an electrical current between two terminals of the respective electrical heater arrangement.

3. A method for evaluating a heat flow to or from a sample in a sample pan using a differential scanning calorimeter, said method comprising the steps of:

a. placing the sample in the sample pan of a pan type, placing the sample pan on a sample-side pan support region, and placing an empty reference pan of the same pan type on a reference-side pan support region;

b. controlling a temperature-controlled heat source for the sample pan such that it follows a desired temperature program;

c. measuring or determining a differential heat flow signal (U) between a sample-side measurement region and a reference side measurement region while no heat is applied by a sample-side or a reference-side local heater arrangement; and d. evaluating the heat flow to or from the sample using the differential heat flow signal (U), a conversion factor (F), and a second calibration factor ($C_E$), whereby the conversion factor (F) is chosen depending on the pan type, and the second calibration factor ($C_E$) is chosen depending on the pan type, a measuring gas' and the desired temperature of measurement.

4. The method of claim 3, wherein:

the second calibration factor ($C_E$) is determined using the method of claim 1 without removing the sample pan or the reference pan between the determination of the second calibration factor ($C_E$) and the evaluation of the heat flow.

5. The method of claim 3, wherein:

a. the conversion factor (F) is chosen depending on the pan type and a temperature of the temperature-controlled heat source; and b. the measurement gas is selected by choosing a second calibration factor ($C_E$) which is determined with a pan of the pan type, the measuring gas' and the temperature of the temperature-controlled heat source.

6. A self-calibrating differential scanning calorimeter suitable to determine a second calibration factor ($C_E$), said differential scanning calorimeter comprising:

a. a temperature-controlled heat source;

b. a sensor arrangement, whereby the sensor arrangement comprises:

i. sample-side and reference-side pan support regions adapted to receive thereon, in heat conductive contact therewith, a bottom region of a sample pan and a reference pan, respectively;

ii. sample-side and reference-side measurement regions; surrounding the sample-side and the reference-side pan support regions, respectively, and 1. a sample-side and a reference-side measurement region sensor operative to output a differential heat flow signal (U) representative of a difference between heat flowing across the sample-side and the reference-side measurement regions; and/or 2. a sample-side measurement region sensor operative to output a sample-side heat flow signal representative of the heat flowing across the sample-side measurement region and a reference-side measurement region sensor operative to output a reference-side heat flow signal representative of the heat flowing across the reference-side measurement region; and iii. a sample-side and a reference-side local heater arrangement adapted to apply a heating power to the sample-side and the reference-side pan support regions, respectively; and c. a data evaluation unit configured to receive the differential heat flow signal (U) and/or the sample-side and the reference-side heat flow signals and signals indicating a differential heating power and/or the heating power applied to the sample-side and the reference-side pan support regions, respectively;

wherein the data evaluation unit comprises a memory with a set of instructions, which when executed, configure the self-calibrating differential scanning calorimeter to execute the method of claim 1 to determine the second calibration factor ($C_E$).

7. The self-calibrating differential scanning calorimeter of claim 6, wherein:

the data evaluation unit is configured to access a first default calibration factor ($C_{Hd}$), which depends on the pan type, the measuring gas, and the desired temperature.

8. The self-calibrating differential scanning calorimeter of claim 6, wherein:

the sensor arrangement is arranged in a volume which is surrounded by the same temperature-controlled heat source.

9. A method for determining a conversion factor (F) with a differential scanning calorimeter which is a self-calibrating differential scanning calorimeter comprising:

a. a temperature-controlled heat source;

b. a sensor arrangement, whereby the sensor arrangement comprises:

i. sample-side and reference-side pan support regions adapted to receive thereon, in heat conductive contact therewith, a bottom region of a sample pan and a reference pan, respectively;

ii. sample-side and reference-side measurement regions surrounding the sample-side and the reference-side pan support regions, respectively, and 1. a sample-side and a reference-side measurement region sensor operative to output a differential heat flow signal (U) representative of a difference between heat flowing across the sample-side and the reference-side measurement regions; and/or 2. a sample-side measurement region sensor operative to output a sample-side heat flow signal representative of the heat flowing across the sample-side measurement region and a reference-side measurement region sensor operative to output a reference-side heat flow signal representative of the heat flowing across the reference-side measurement region; and iii. a sample-side and a reference-side local heater arrangement adapted to apply a heating power to the sample-side and the reference-side pan support regions, respectively; and c. a data evaluation unit configured to receive the differential heat flow signal (U) and/or the sample-side and the reference-side heat flow signals and signals indicating a differential heating power and/or the heating power applied to the sample-side and the reference-side pan support regions, respectively;

wherein the data evaluation unit comprises a memory with a set of instructions, which when executed, configure the self-calibrating differential scanning calorimeter to execute the method of claim 1 to determine the second calibration factor ($C_E$), said method comprising the steps of:

a. executing the method of claim 1 to determine the second calibration factor ($C_E$) at the first desired temperature whereby the pan comprises a calibration sample which is known to undergo an exothermic or endothermic transition at a transition temperature which is different from the first desired temperature;

b. controlling the heat source such that the transition temperature is achieved and the transition of the sample takes place while no heat is applied by the sample-side or the reference-side local heater arrangement;

c. integrating the differential heat flow signal (U), during the transition of the calibration sample and comparing this result with a theoretical enthalpy of the transition of the calibration sample; and d. storing the ratio of a first calibration factor ($C_H$) and the second calibration factor ($C_E$) as the conversion factor (F).

10. A method for determining a conversion factor (F) with a differential scanning calorimeter which is a self-calibrating differential scanning calorimeter comprising:

a. a temperature-controlled heat source;

b. a sensor arrangement, whereby the sensor arrangement comprises:

i. sample-side and reference-side pan support regions adapted to receive thereon, in heat conductive contact therewith, a bottom region of a sample pan and a reference pan, respectively;

ii. sample-side and reference-side measurement regions surrounding the sample-side and the reference-side pan support regions, respectively, and 1. a sample-side and a reference-side measurement region sensor operative to output a differential heat flow signal (U) representative of a difference between heat flowing across the sample-side and the reference-side measurement regions; and/or 2. a sample-side measurement region sensor operative to output a sample-side heat flow signal representative of the heat flowing across the sample-side measurement region and a reference-side measurement region sensor operative to output a reference-side heat flow signal representative of the heat flowing across the reference-side measurement region; and iii. a sample-side and a reference-side local heater arrangement adapted to apply a heating power to the sample-side and the reference-side pan support regions, respectively; and c. a data evaluation unit configured to receive the differential heat flow signal (U) and/or the sample-side and the reference-side heat flow signals and signals indicating a differential heating power and/or the heating power applied to the sample-side and the reference-side pan support regions, respectively;

wherein the data evaluation unit comprises a memory with a set of instructions, which when executed, configure the self-calibrating differential scanning calorimeter to execute the method of claim 1 to determine the second calibration factor ($C_E$), said method comprising the steps of:

a. executing the method of claim 1 to determine the second calibration factor ($C_E$) at a third temperature;

b. accessing a first default calibration factor ($C_{Hd}$) for the pan type and the measuring gas; and c. storing the ratio of the first default calibration factor and the second calibration factor ($C_{Hd}/C_E$) as the conversion factor (F).

11. A method for evaluating a heat flow to or from a sample in a sample pan using a differential scanning calorimeter which is a self-calibrating differential scanning calorimeter according to claim 6, said method comprising the steps of:

a. placing the sample in the sample pan of a pan type, placing the sample pan on the sample-side pan support region, placing an empty reference pan of the same pan type on the reference-side pan support region;

b. controlling the temperature-controlled heat source such that it follows a desired temperature program;

c. controlling the sample-side and the reference-side local heater arrangements such that an absolute value of the differential heat flow signal (U) is minimized;

d. measuring or determining a differential heating power ($P_{el}$) of the local heater arrangements as well as the differential heat flow signal (U); and e. estimating the heat flow to or from the sample using the differential heat flow signal (U) and the differential heating power ($P_{el}$), a conversion factor (F), and the second calibration factor ($C_E$), whereby the conversion factor (F) is chosen depending on the pan type, while the second calibration factor ($C_E$) is chosen depending on the pan type, the measuring gas, and the desired temperature of the measurement.

12. The method of claim 11 wherein:

the differential heating power ($P_{el}$) is controlled by a proportional controller with a gain ($k_p$) to minimize the absolute value of the differential heat flow signal (U).

13. The method of claim 11, wherein:

the second calibration factor ($C_E$) is determined using the method of claim 1 without removing the sample pan or the reference pan between the determination of ($C_E$) and the estimation of the second calibration factor heat flow.

14. A self-calibrating differential scanning calorimeter suitable to determine a second calibration factor ($C_E$), said differential scanning calorimeter comprising:

a. a temperature-controlled heat source;

b. a sensor arrangement, whereby the sensor arrangement comprises:

i. sample-side and reference-side pan support regions adapted to receive thereon, in heat conductive contact therewith, a bottom region of a sample pan and a reference pan, respectively;

ii. sample-side and reference-side measurement regions, surrounding the sample-side and the reference-side pan support regions, respectively, and 1. a sample-side and a reference-side measurement region sensor operative to output a differential heat flow signal (U) representative of a difference between heat flowing across the sample-side and the reference-side measurement regions; and/or 2. a sample-side measurement region sensor operative to output a sample-side heat flow signal representative of the heat flowing across the sample-side measurement region and a reference-side measurement region sensor operative to output a reference-side heat flow signal representative of the heat flowing across the reference-side measurement region;

iii. a sample-side and a reference-side local heater arrangement adapted to apply a heating power to the sample-side and the reference-side pan support regions, respectively; and c. a data evaluation unit configured to receive data from performance of the method of claim 11 using the self-calibrating differential scanning calorimeter, said data including the differential heat flow signal (U), wherein the data evaluation unit comprises a memory with a set of instructions, which when executed, configure the self-calibrating differential scanning calorimeter to determine the second calibration factor ($C_E$) by estimating the heat flow to or from the sample using the differential heat flow signal (U) and a conversion factor (F) chosen by the data evaluation unit depending on the pan type, the measuring gas, and the desired temperature of the measurement during performance of the method of claim 11.

* * * * *